(12) United States Patent
Matsumuro et al.

(10) Patent No.: US 10,608,569 B2
(45) Date of Patent: Mar. 31, 2020

(54) CONTROL DEVICE OF AC ROTATING ELECTRICAL MACHINE

(71) Applicant: Mitsubishi Electric Corporation, Tokyo (JP)

(72) Inventors: Daisuke Matsumuro, Tokyo (JP); Keiichi Enoki, Tokyo (JP); Yoshimasa Nishijima, Tokyo (JP); Masutaka Watanabe, Tokyo (JP); Shingo Harada, Tokyo (JP); Yasukazu Murata, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/688,992

(22) Filed: Aug. 29, 2017

(65) Prior Publication Data
US 2018/0278191 A1    Sep. 27, 2018

(30) Foreign Application Priority Data

Mar. 24, 2017    (JP) .................................. 2017-058869

(51) Int. Cl.
*H02P 23/28*    (2016.01)
*H02P 23/22*    (2016.01)
*H02P 6/16*    (2016.01)

(52) U.S. Cl.
CPC ................ *H02P 23/28* (2016.02); *H02P 6/16* (2013.01); *H02P 23/22* (2016.02); *H02P 2205/01* (2013.01); *H02P 2205/05* (2013.01)

(58) Field of Classification Search
CPC .. H02P 23/28; H02P 23/22; H02P 6/16; H02P 2205/01; H02P 2205/05

USPC ......................................................... 318/807
See application file for complete search history.

(56) References Cited

U.S. PATENT DOCUMENTS

| 6,483,270 B1 * | 11/2002 | Miyazaki | G05B 19/231 318/609 |
| 2004/0245961 A1 * | 12/2004 | Ueda | H02M 1/425 318/805 |
| 2017/0201201 A1 * | 7/2017 | Aoki | H02P 21/22 |
| 2017/0282968 A1 * | 10/2017 | Kezobo | G01R 31/00 |

(Continued)

FOREIGN PATENT DOCUMENTS

| JP | 2000-184732 A | 6/2000 |
| JP | 4794603 B2 | 10/2011 |

OTHER PUBLICATIONS

Communication dated Nov. 21, 2017, from the Japanese Patent Office in counterpart application No. 2017-058869.

*Primary Examiner* — Eduardo Colon Santana
*Assistant Examiner* — Devon A Joseph
(74) *Attorney, Agent, or Firm* — Sughrue Mion, PLLC; Richard C. Turner

(57) ABSTRACT

A control device of an AC rotating electrical machine includes: a midpoint potential detection unit 12 that detects, for respective phases, midpoint potentials 43, 44, 45 of upper switching elements 41 and lower switching elements 42 of an inverter circuit 20; a phase current detection unit 23 that detects a phase current of each phase of an AC rotating electrical machine 3; and a CPU 11 that calculates a current estimated value Idc of DC current that is input from a DC power supply 2 to the inverter circuit 20, on the basis of the detected midpoint potential of each phase and the phase current of each phase.

6 Claims, 4 Drawing Sheets

(56) References Cited

U.S. PATENT DOCUMENTS

| | | | |
|---|---|---|---|
| 2017/0310244 A1* | 10/2017 | Goetting | H02H 3/083 |
| 2017/0310265 A1* | 10/2017 | Matsuura | H02P 29/027 |
| 2017/0366101 A1* | 12/2017 | Suzuki | H02P 21/22 |
| 2018/0022378 A1* | 1/2018 | Furukawa | H02P 6/08 |
| | | | 324/76.77 |
| 2018/0115264 A1* | 4/2018 | Hano | H02P 6/28 |

* cited by examiner

CONTROL DEVICE OF AC ROTATING ELECTRICAL MACHINE

BACKGROUND OF THE INVENTION

1. Field of the Invention

The present invention relates to a control device of an AC rotating electrical machine, and more particularly to a control device of an AC rotating electrical machine that controls an AC rotating electrical machine provided with polyphase armature windings.

2. Description of the Related Art

Conventional control devices of AC rotating electrical machines are provided with an inverter circuit for complementary PWM driving of three-phase coils that make up a brushless motor, and a control circuit that controls energizing current in the brushless motor, and the energizing current in the brushless motor is controlled in accordance with power-supply current (for instance, Japanese Patent No. 4794603).

In Japanese Patent No. 4794603, the control circuit sets a first correction value in accordance with a dead time period of complementary PWM driving and in accordance with phase currents, and the first correction value is subtracted from a duty ratio of each phase of the three-phase coils that are complementary PWM-driven, to correct as a result the duty ratio of each phase by the dead time period.

In Japanese Patent No. 4794603, the control circuit further multiplies the duty ratio, having been corrected by dead time period, by a power-supply voltage detected by a voltage detection unit, to work out a terminal voltage of each phase of the three-phase coils, and multiplies the terminal voltage of each phase and the phase currents detected by the current detector, to thereby work out each phase power of the three phases. The control circuit totals up the phase power of three phases, to obtain the power supplied to the brushless motor, and calculates each power-supply current through division of the respective supply power by the respective power-supply voltage.

SUMMARY OF THE INVENTION

In the conventional control device disclosed in Japanese Patent No. 4794603, the dead time period had to be corrected, since phase voltages of the AC rotating electrical machine are estimated from a phase voltage command value. This was problematic in terms of the increased processing load of the CPU that made up the control circuit.

It is an object of the present invention, arrived at in order to solve the above problem, to obtain a control device of an AC rotating electrical machine in which the processing load of a CPU is reduced and which allows calculating a current estimated value of DC current with good precision.

The present invention is a control device of an AC rotating electrical machine that controls, via an inverter circuit, an AC rotating electrical machine provided with polyphase armature windings, the inverter circuit being made up of respective upper switching elements and lower switching elements provided corresponding to each phase of the AC rotating electrical machine, and receiving supply of power from a DC power supply to drive the AC rotating electrical machine, the control device including: a midpoint potential detection unit that detects, for each phase, a midpoint potential between the upper switching element and the lower switching element of the inverter circuit; a phase current detection unit that detects a phase current of each phase of the AC rotating electrical machine; and a control unit that calculates a current estimated value of DC current that is input from the DC power supply to the inverter circuit, on the basis of the midpoint potential of each phase as detected by the midpoint potential detection unit and the phase current of each phase as detected by the phase current detection unit.

In the present invention phase voltages are worked out on the basis of directly measured midpoint potentials, and a current estimated value of DC current is calculated from the phase voltages. Accordingly, it becomes possible to calculate a current estimated value of DC current with good precision, and to reduce the processing load of a CPU, since correction of dead time or the like and element variability need not be addressed.

DESCRIPTION OF THE PREFERRED EMBODIMENT

Embodiment 1

An embodiment of the present invention will be explained next with reference to accompanying drawings.

Figure 1:
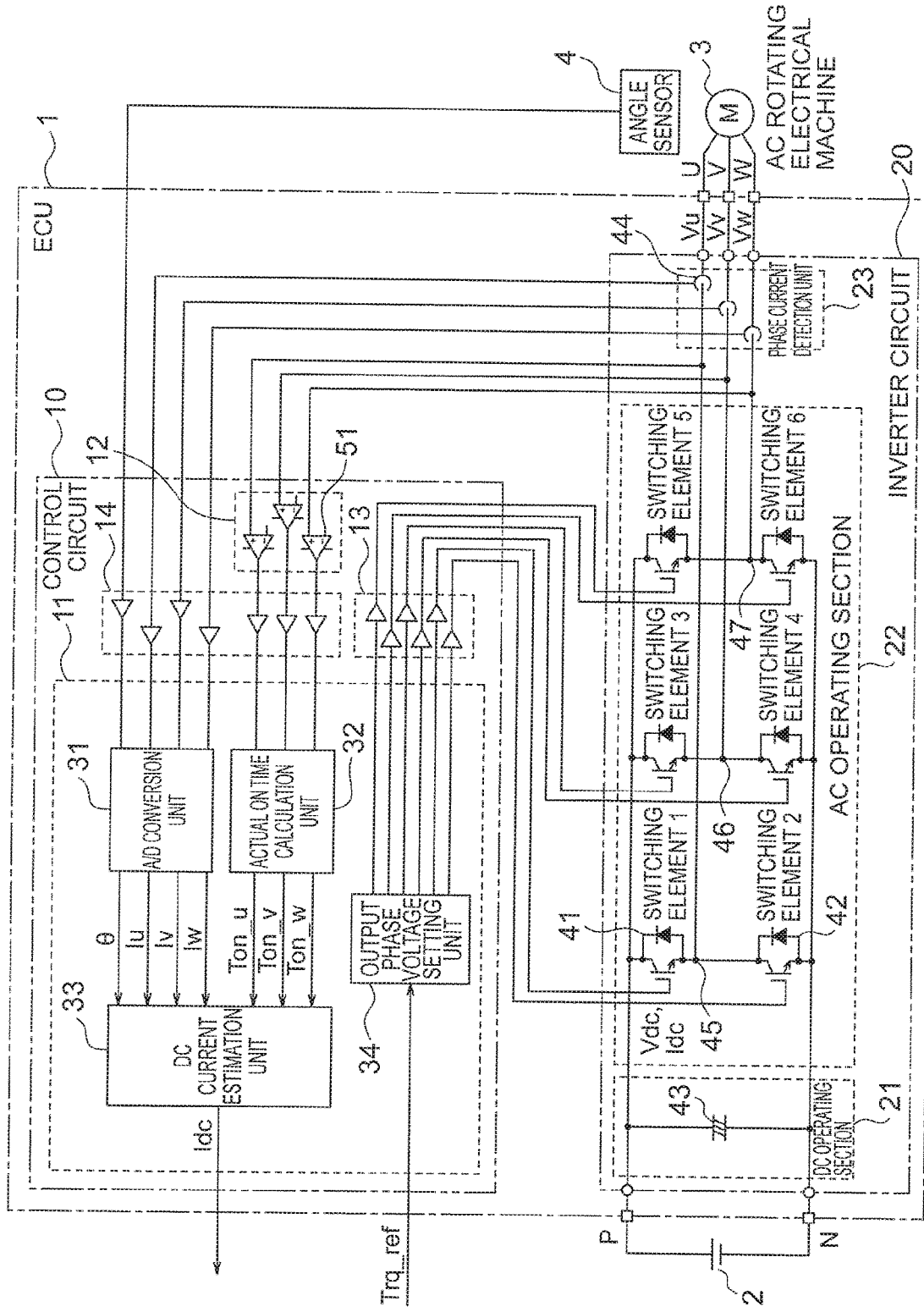
FIG. 1 is a block diagram illustrating the configuration of a control device of an AC rotating electrical machine according to Embodiment 1 of the present invention.

FIG. 1 is a block diagram illustrating the configuration of a control device of an AC rotating electrical machine according to Embodiment 1 of the present invention. In the explanation of Embodiment 1, an AC rotating electrical machine provided with polyphase armature windings will be given as an example of the AC rotating electrical machine 3. In particular, a three-phase AC rotating electrical machine will be illustrated below, but the number of phases is not limited thereto.

The control device of an AC rotating electrical machine according to Embodiment 1 is made up of a control circuit 10 provided in for instance an electronic control unit (ECU) 1, as illustrated in FIG. 1. The control device controls the operation of the AC rotating electrical machine 3 via an inverter circuit 20.

The ECU 1 is provided with the inverter circuit 20 that functions as a driving power supply of the AC rotating electrical machine 3, and with the control circuit 10 that controls the inverter circuit 20.

Output terminals P, N of a DC power supply 2 are connected to input terminals of the ECU 1, so that DC power is supplied to the ECU 1 from the DC power supply 2. The DC power supply 2 is made up of a battery or the like.

Three-phase input terminals U, V, W of the AC rotating electrical machine 3 are connected to respective three-phase output terminals of the ECU 1. An angle sensor 4 that detects the rotation angle θ of the AC rotating electrical machine 3 is connected to the ECU 1.

The inverter circuit 20 is provided with an AC operating section 22 that drives the AC rotating electrical machine 3, a DC operating section 21 that supplies DC power to the AC operating section 22, through supply of power from the DC power supply 2, and a phase current detection unit 23 that measures phase current of each phase of the AC rotating electrical machine 3. The inverter circuit 20 receives power supplied from the DC power supply 2 and drives the AC rotating electrical machine 3.

The AC operating section 22 has three pairs of switching elements, respectively paired up vertically and corresponding to the three phases of the AC rotating electrical machine 3, and the AC operating section 22 performs a switching operation in accordance with driving pulses output from the CPU 11. In a specific explanation, as illustrated in FIG. 1, an upper switching element 1 and a lower switching element 2 constitute one pair, the upper switching element 1 and the lower switching element 2 being connected in series. A connection point of the foregoing will be referred to hereafter as midpoint 45. The midpoint 45 is connected to an input terminal U of the AC rotating electrical machine 3. Similarly, an upper switching element 3 and a lower switching element 4 constitute one pair, the upper switching element 3 and the lower switching element 4 being connected in series. A connection point of the foregoing will be referred to hereafter as midpoint 46. The midpoint 46 is connected to an input terminal V of the AC rotating electrical machine 3. Similarly, an upper switching element 5 and a lower switching element 6 constitute one pair, the upper switching element 5 and the lower switching element 6 being connected in series. A connection point of the foregoing will be referred to hereafter as midpoint 47. The midpoint 47 is connected to an input terminal W of the AC rotating electrical machine 3. The upper switching elements 1, 3, 5 will be collectively referred to hereafter as upper switching elements 41, and the lower switching elements 2, 4, 6 will be collectively referred to as lower switching elements 42. The upper switching elements 41 are connected to the output terminal P of the DC power supply 2 and the lower switching elements 42 are connected to the output terminal N of the DC power supply 2.

The DC operating section 21 is made up of a smoothing capacitor 43. The DC operating section 21 smooths the voltage waveform of the DC power from the DC power supply 2, and supplies the smoothed waveform to the AC operating section 22. In the example of FIG. 1, the DC power supply 2 is connected to the DC operating section 21, but the present invention is not limited thereto, and for instance a power supply boosted by a converter or the like may be used, instead of the DC power supply 2, as the power supply connected to the DC operating section 21.

The phase current detection unit 23 has three current sensors 44 corresponding to the three phases of the AC rotating electrical machine 3. The three current sensors 44 are each connected to each phase of the AC rotating electrical machine 3, and measure phase currents Iu, Iv, Iw of respective phases. In the example of FIG. 1, the current sensor 44 is attached for each phase. However, it suffices herein that the current value of each phase can be acquired by the CPU 11, and hence there may be attached current sensors 44 for only two phases, from among the three phases, with the current value of the remaining one phase being calculated on the basis of current values of two phases by virtue of the fact that the sum of the phase currents is zero.

The control circuit 10 is provided with the CPU 11 that performs various computations, a midpoint potential detection unit 12 that detects an intermediate potential, referenced to N, of the upper and lower switching elements 41, 42 within the inverter circuit 20, a gate driver 13 that drives the upper and lower switching elements 41, 42 within the inverter circuit 20, and an input interface circuit 14 of various input signals for the CPU 11. The control circuit 10 controls the inverter circuit 20 using, as input information, a torque command value Trq_ref input from outside. The inverter circuit 20 drives the AC rotating electrical machine 3 as a result to generate torque according to the torque command value Trq_ref.

The midpoint potential detection unit 12 has three comparators 51 corresponding to the three phases of the AC rotating electrical machine 3. Each midpoint potential VPFB_u, VPFB_v, VPFB_w of the midpoint 45, 46, 47 of the upper and lower switching elements 41, 42 of each phase in the AC operating section 22 of the inverter circuit 20 is input to one input terminal from among the two input terminals of each comparator 51. A threshold voltage set beforehand is input to the other input terminal of each comparator 51. The midpoint potential detection unit 12 determines, by way of the comparators 51, whether or not the midpoint potentials VPFB_u, VPFB_v, VPFB_w of the upper and lower switching elements 41, 42 of the respective phases are equal to or greater than a threshold voltage. The midpoint potential detection unit 12 outputs a Hi signal to the CPU 11 if the midpoint potentials are equal to or greater than the threshold voltage, and outputs a Low signal to the CPU 11 if the midpoint potentials are lower than the threshold voltage.

The gate driver 13 receives driving pulses output from the output phase voltage setting unit 34 of the CPU 11, and drives the switching elements 1 to 6 of the inverter circuit 20.

The CPU 11 is provided with an A/D conversion unit 31, an actual ON time calculation unit 32, a DC current estimation unit 33 and an output phase voltage setting unit 34.

The rotation angle θ of the AC rotating electrical machine 3 detected by the angle sensor 4, and phase currents Iu, Iv, Iw of each phase of the AC rotating electrical machine 3 measured by the three current sensors 44 of the phase current detection unit 23 are input to the A/D conversion unit 31 via the input interface circuit 14. The A/D conversion unit 31 converts these analog signals to digital signals, and inputs the digital signals to the DC current estimation unit 33.

A Hi signal and a Low signal are input, for each phase, to the actual ON time calculation unit 32, from the midpoint potential detection unit 12, via the input interface circuit 14. On the basis of the Hi signal and the Low signal, the actual ON time calculation unit detects, for each phase, rising and falling of the Hi signal, to measure thereby the period of the Hi signal, i.e. the lapse of time during which respective signals from the midpoint potential detection unit 12 are in an ON state, to calculate actual ON times Ton_u, Ton_v, Ton_w.

The DC current estimation unit 33 calculates a DC current estimated value Idc on the basis of the phase currents Iu, Iv, Iw from the A/D conversion unit 31, the actual ON times Ton_u, Ton_v, Ton_w from the actual ON time calculation unit 32, and the cycle of a carrier wave described below.

The output phase voltage setting unit 34 has input thereto the torque command value Trq_ref set by an external ECU or another control unit. The output phase voltage setting unit 34 sets a phase voltage command value, in accordance with the torque command value Trq_ref, and outputs driving pulses to the gate driver 13. The above operation will be explained in concrete terms next. The output phase voltage setting unit 34 firstly sets a phase voltage command value in accordance with the input torque command value Trq_ref. Thereafter, the output phase voltage setting unit 34 converts the phase voltage command value to driving pulses, using a carrier wave, in order to control turning ON/OFF of the switching elements 1 to 6 of the inverter circuit 20. The carrier wave is a triangular wave of sawtooth shape, such as that denoted by the reference symbol 71 in FIGS. 4A and 4B. The carrier wave will be described further on. The output phase voltage setting unit 34 outputs driving pulses according to the torque command value Trq_ref to the gate driver 13. A concern arises in that if the output phase voltage setting unit 34 outputs herein driving pulses in response to which the upper and lower switching elements 41, 42 are switched ON/OFF simultaneously, the switching elements may be damaged, through short-circuiting of the DC power supply 2 and GND, as the upper switching elements 41 and the lower switching elements 42 are brought simultaneously to an ON state due for instance to operational delay in the switching elements. To prevent this occurrence, the output phase voltage setting unit 34 sets a period during which the upper switching elements 41 and the lower switching elements 42 are simultaneously OFF, during switching of the switching elements from ON to OFF or from OFF to ON. This period will be referred to hereafter as dead time.

The operation of the ECU 1 will be explained next with reference to FIG. 1.

In FIG. 1, the midpoint potential detection unit 12 determines, by way of the comparators 51, whether or not the midpoint potentials of the upper and lower switching elements 41, 42 of the respective phases are equal to or greater than a threshold voltage; the midpoint potential detection unit 12 outputs the Hi signal to the CPU 11 if the midpoint potentials are equal to or higher than the threshold voltage, and outputs the Low signal if the midpoint potentials are lower than the threshold voltage.

The actual ON time calculation unit 32 detects the rising and falling of the Hi signal for each phase input via the input interface circuit 14, from the midpoint potential detection unit 12, and measures the period of the Hi signal, i.e. the lapse of time during which the output signal from the midpoint potential detection unit 12 is ON, to calculate the actual ON times Ton_u, Ton_v, Ton_w.

The DC current estimation unit 33 calculates the DC current estimated value Idc using the phase currents Iu, Iv, Iw, the actual ON times Ton_u, Ton_v, Ton_w and the cycle of the carrier wave.

The calculated DC current estimated value Idc is output to for instance an external ECU or another control unit, and is used for setting of the torque command value Trq_ref.

The output phase voltage setting unit 34 sets a phase voltage command value in accordance with the torque command value Trq_ref, converts the phase voltage command value to driving pulses for the gate driver 13, and outputs the driving pulses.

The gate driver 13 receives the driving pulses output from the output phase voltage setting unit 34, and drives the switching elements 1 to 6 of the inverter circuit 20.

As a result, the inverter circuit 20 drives the AC rotating electrical machine 3 to generate torque according to the torque command value Trq_ref.

Figure 2:
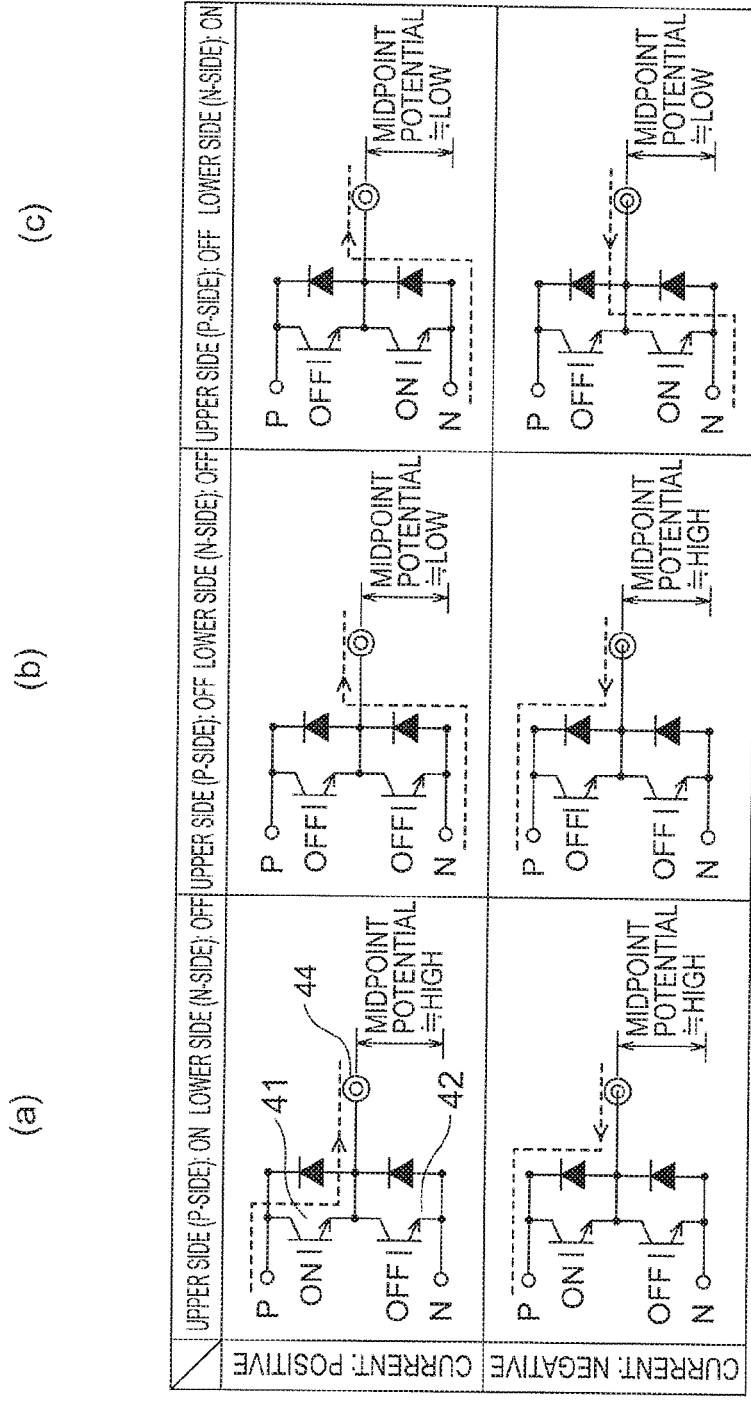
FIG. 2 is a diagram illustrating six current patterns classified on the basis of the state of current direction and on the basis of the ON/OFF state of upper and lower switching elements of the inverter circuit controlled by the control device of an AC rotating electrical machine according to Embodiment 1 of the present invention.

The operation of the actual ON time calculation unit 32 will be explained next with reference to (a) to (c) of FIG. 2. In FIG. 2, (a) to (c) illustrate current patterns, focusing on one phase among the upper and lower switching elements 41, 42 for the three phases of the AC operating section 22. The P, N terminals in (a) to (c) of FIG. 2 are the output terminals P, N of the DC power supply 2 illustrated in FIG. 1. In (a) to (c) of FIG. 2, the upper tier illustrates instances where the current direction is a positive direction and the lower tier illustrates instances where the current direction is a negative direction. Further, (a) of FIG. 2 illustrates a state in which the upper switching elements 41 are ON and the lower switching elements 42 are OFF. Further, (b) of FIG. 2 illustrates a state in which the upper switching elements 41 are OFF and the lower switching elements 42 are OFF. Further, (c) of FIG. 2 illustrates a state in which the upper switching elements 41 are OFF and the lower switching elements 42 are ON. There are thus a total of six conceivable current patterns illustrated in (a) to (c) of FIG. 2, on the basis of the ON/OFF state of the upper and lower switching elements 41, 42 and the current direction state. In FIG. 2, midpoint potentials (referenced to the N side) of the upper and lower switching elements 41, 42 of the six patterns are depicted as high/low.

As illustrated in (a) to (c) of FIG. 2, whether the midpoint potential of the upper and lower switching elements is high or low can be naturally estimated on the basis of the current direction and the ON/OFF state of the upper and lower switching elements 41, 42.

A feature wherein the midpoint potential of the upper and lower switching elements 41, 42 is high signifies that DC voltage (actually DC voltage/2) is being applied to the corresponding phase.

That is, measuring the midpoint potential allows determining whether DC voltage is being actually applied to the relevant phase.

This feature is exploited in Embodiment 1, where the period during which the midpoint potential of the upper and lower switching elements of each phase is High, i.e. the ON period, is measured by the actual ON time calculation unit 32, to calculate as a result the actual ON times Ton_u, Ton_v, Ton_w during which voltage is actually applied to the AC rotating electrical machine 3.

In the example of FIG. 1, there are used midpoint potentials converted to Hi/Low signals, obtained through comparison with the threshold voltage by the comparators 51, but the actual ON time may be calculated by determining Hi/Low using the respective A/D-converted midpoint potentials as they are. Specifically, the actual ON times Ton_u, Ton_v, Ton_w may be calculated using the lapse of time from rising to falling of the midpoint potential as the period of the Hi signal.

The configuration of the DC current estimation unit 33 will be explained next with reference to FIG. 1 and FIG. 3.

Figure 3:
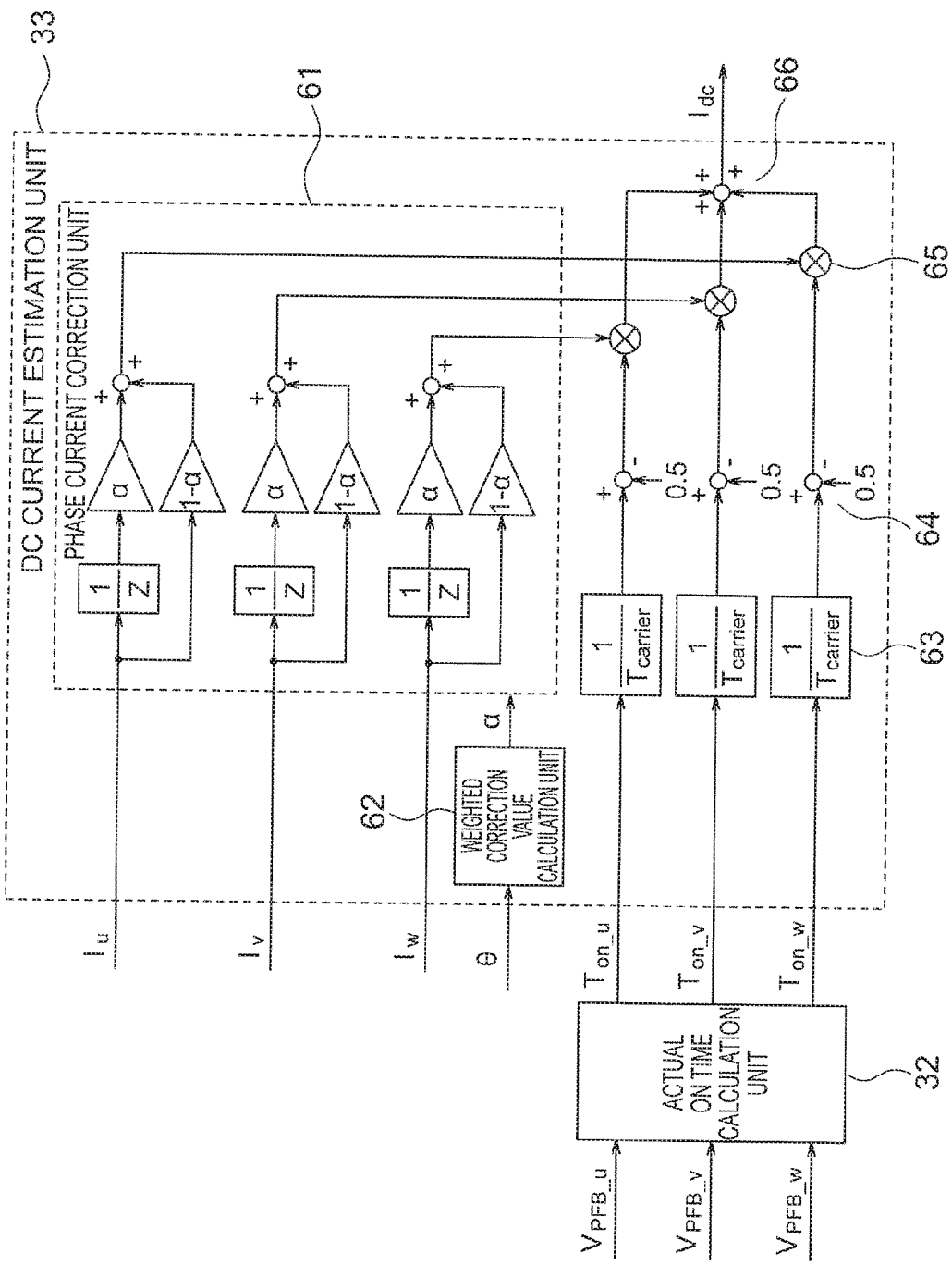
FIG. 3 is a block diagram illustrating the configuration of a DC current estimation unit provided in the control device of an AC rotating electrical machine according to Embodiment 1 of the present invention.

FIG. 3 is a block diagram illustrating the configuration of the DC current estimation unit 33. As illustrated in FIG. 3, the DC current estimation unit 33 is provided with a phase current correction unit 61, a weighted correction value calculation unit 62, dividers 63, subtractors 64, multipliers 65 and an adder 66. The dividers 63, subtractors 64, multipliers 65 are provided as three of each, corresponding to the respective phases.

The weighted correction value calculation unit 62 works out a weighted correction value α on the basis of the rotation angle θ detected by the angle sensor 4. Although the weighted correction value α will be described below, for instance there may be prepared a two-dimensional map in which there is established beforehand a relationship between the weighted correction value α and the rotational speed of the AC rotating electrical machine 3 calculated on the basis of the rotation angle θ, such that the weighted correction value calculation unit 62 works out the rotational speed on the basis of rotation angle θ, and, on the basis of that rotational speed, works out the weighted correction value α corresponding to the rotational speed by referring to the two-dimensional map.

The phase current correction unit 61 estimates the phase current value of ON state of the switching elements using the weighted correction value α, previous values $I_{x(k-1)}$ and present values $I_{x(k)}$ of the phase currents Iu, Iv, Iw detected by the phase current detection unit 23. Herein, x is u, v and w. In the phase current correction unit 61, the estimated value of each present phase current value is calculated through weighted correction using (α−1) as the weighted correction value by which the present values $I_{x(k)}$ are multiplied, and using α as the weighted correction value by which the previous values $I_{x(k-1)}$ are multiplied, and through summation of the present values and the previous values after weighted correction.

The dividers 63 divide the actual ON times Ton_u, Ton_v, Ton_w, calculated by the actual ON time calculation unit 32, by the cycle Tcarrier of the carrier wave.

The subtractors 64 subtract 0.5 from the computation results of the dividers 63.

For each phase, the multipliers 65 multiply the computation result of the subtractors 64 by the estimated value of the present phase current value, for each phase, output from the phase current correction unit 61.

The adder 66 works out the sum of the computation results of the multipliers 65 of each phase.

The operation of the DC current estimation unit 33 will be explained next with reference to FIG. 1 and FIG. 3.

The phase currents that are used in the DC current estimation unit 33 will be explained first. The phase currents of the respective phases as detected by the phase current detection unit 23 are sampled at a cycle timing of the carrier wave and are subjected to A/D conversion by the A/D conversion unit 31. The phase currents having undergone A/D conversion are input to the DC current estimation unit 33, to be used in the latter.

In FIG. 1, the power P consumed by the AC operating section 22 is the product of a DC voltage Vdc applied to the AC operating section 22 and the DC current estimated value Idc that flows into the AC operating section 22, and is also the sum of loss power Psw of the switching elements and supply power Pm to the AC rotating electrical machine 3. Accordingly, the power P is given by Expression (1) below.

[Math. 1]

$$P = V_{dc} \times I_{dc} = P_{sw} + P_m \quad (1)$$

According to Expression (1), the DC current estimated value Idc can be calculated by dividing the power P of the AC operating section 22 by the DC voltage.

The loss power Psw is 0 [W] if the switching elements are assumed to behave as identical switches, in which case there holds Expression (2) below.

[Math. 2]

$$I_{dc} = \frac{P_m}{V_{dc}} \quad (2)$$

The supply power Pm for the AC rotating electrical machine 3 is the sum of each supply power Pu, Pv, Pw of each phase; accordingly, the supply power Pm is given by Expression (3) below, given that each supply power Pu, Pv, Pw is respectively the product of each phase current Iu, Iv, Iw and each phase voltage Vu, Vv, Vw.

[Math. 3]

$$P_m = (I_u \times V_u) + (I_v \times V_v) + (I_w \times V_w) \quad (3)$$

The DC current estimated value Idc is given by Expression (4), on the basis of Expressions (2) and (3).

[Math. 4]

$$I_{dc} = \frac{(I_u \times V_u) + (I_u \times V_u) + (I_u \times V_u)}{V_{dc}} \quad (4)$$

$$= \frac{V_u}{V_{dc}} I_u + \frac{V_v}{V_{dc}} I_v + \frac{V_w}{V_{dc}} I_w$$

In order to calculate the DC current estimated value Idc through computation of Expression (4), proportions Vu/Vdc, Vv/Vdc, Vw/Vdc of each phase voltage with respect to the DC voltage of Expression (4) are worked out, in accordance with the method below, using Expression (6).

The driving pulses for generating phase voltage are generated by a carrier wave; accordingly the cycle of the actual ON time of each phase voltage and the cycle of the carrier wave are synchronized with each other.

The relationship between phase voltage and the proportion of actual ON time of phase voltage in the cycle of the carrier wave is as follows.

If the proportion is 100%, then phase voltage=Vdc/2 [V].
If the proportion is 50%, then phase voltage=0 [V].
If the proportion is 0%, then phase voltage=−Vdc/2 [V].

Therefore, the U-phase through W-phase voltages are given by Expression (5) below, using the actual ON times Ton_u, Ton_v, Ton_w, the cycle Tcarrier of the carrier wave and the DC voltage Vdc. Herein, x is u, v and w.

[Math. 5]

$$V_x = \left\{ \left( \frac{T_{on\_x}}{T_{carrier}} \right) \times 2 - 1 \right\} \times \frac{V_{dc}}{2} \quad (5)$$

The proportions Vu/Vdc, Vv/Vdc, Vw/Vdc of phase voltage with respect to the DC voltage are calculated using Expression (6) by modifying Expression (5). Herein, x is u, v and w.

[Math. 6]

$$\frac{V_x}{V_{dc}} = \frac{T_{on\_x}}{T_{carrier}} - 0.5 \quad (6)$$

The DC current estimation unit 33 can calculate the DC current estimated value Idc using Expression (7) below, by substituting in Expression (4) the proportions Vu/Vdc, Vv/Vdc, Vw/Vdc of each phase voltage with respect to the DC voltage, calculated in accordance with Expression (6), and the phase currents Iu, Iv, Iw having been sampled and undergone A/D conversion at the timing of the cycle of the carrier wave. The calculation in Expression (7) below is performed by the dividers 63, the subtractors 64, the multipliers 65 and the adder 66.

[Math. 7]

$$I_{dc} = \left(\frac{T_{on\_u}}{T_{carrier}} - 0.5\right)I_u + \left(\frac{T_{on\_v}}{T_{carrier}} - 0.5\right)I_v + \left(\frac{T_{on\_w}}{T_{carrier}} - 0.5\right)I_w \quad (7)$$

The dead time is not uniform due to variability in the ON/OFF operation of the switching elements 1 to 6. Accordingly, dead time correction must be factored in to calculate the DC current estimated value Idc from the phase voltage command value. In Embodiment 1, however, the DC current estimated value Idc is calculated from the actual ON time of each phase voltage, using Expressions (4), (6); as a result, the above dead time correction process becomes unnecessary, the load of the CPU 11 can be reduced, and the DC current estimated value Idc can be calculated with good precision.

The phase currents Iu, Iv, Iw are sampled, by the A/D conversion unit 31, at the timings of the troughs or crests of the carrier wave. Herein, the phase currents that are used in Expression (7) must have a phase current value acquired during phase voltage application, i.e. with the switching elements in an ON state.

Figure 4A:
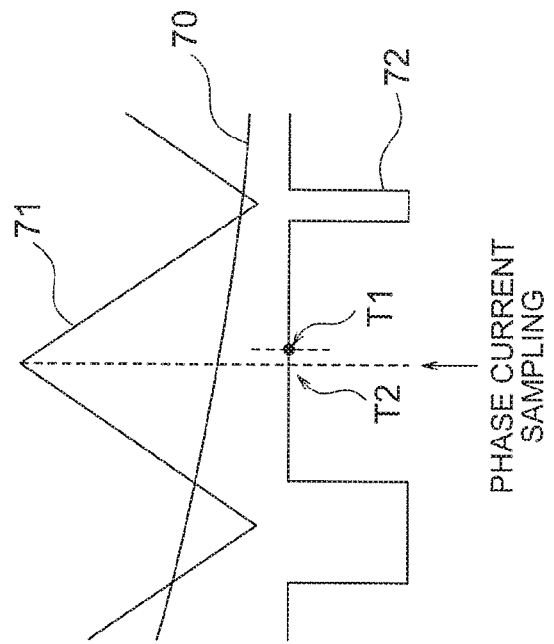
FIGS. 4A and 4B are diagrams illustrating instances where phase current is sampled at the timing of the troughs and at the timing of the crests of a carrier wave, in the control device of an AC rotating electrical machine according to Embodiment 1 of the present invention.
Figure 4B:
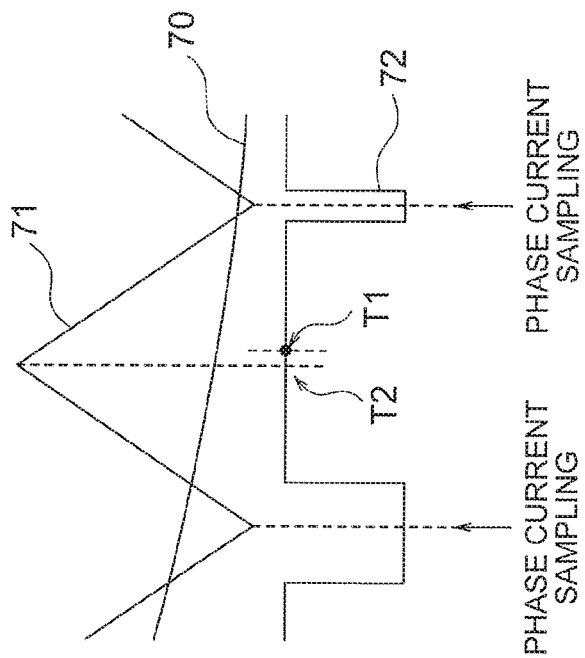

Sampling at the timing of the trough or crest of the carrier wave will be explained next with reference to FIGS. 4A and 4B. FIG. 4A illustrates an instance of sampling of phase current at the timing of the trough of a carrier wave, and FIG. 4B illustrates an instance of sampling of phase current at the timing of the crest of the carrier wave.

As described above, the output phase voltage setting unit 34 sets a phase voltage command value 70 in accordance with the torque command value Trq_ref. Thereafter, the output phase voltage setting unit 34 converts the phase voltage command value 70 to a driving pulse 72 using the carrier wave 71, as illustrated in FIGS. 4A and 4B. Specifically, the carrier wave 71 is a triangular wave of sawtooth shape, as illustrated in FIGS. 4A and 4B. In comparison between the carrier wave 71 and the phase voltage command value 70, if the carrier wave 71 is smaller than the phase voltage command value 70, then the driving pulse 72 is set to an OFF state, and conversely, if the carrier wave 71 is equal to or greater than the phase voltage command value 70, the driving pulse 72 is set to an ON state. The driving pulse 72 is thus generated in the above manner.

In sampling of the phase current at the timing of the troughs of the carrier wave 71, as illustrated in FIG. 4A, it is necessary to estimate the phase current value with the switching elements are in an ON state, since sampling is performed with the switching elements in an OFF state.

Therefore, the phase current correction unit 61 works out an estimated value of the phase current values Iu, Iv, Iw of the time where the switching elements are in an ON state, on the basis of Expression (8) below using the previous values $I_{x(k-1)}$ of the phase current values acquired at the timing of a trough of the carrier wave 71, the present values $I_{x(k)}$, and the weighted correction value α. Herein, x is u, v and w.

[Math. 8]

$$I_{x(k)} = (1-\alpha)I_{x(k)} + \alpha I_{x(k-1)} \quad (8)$$

In Expression (8), the weighted correction value α is set to take on a value lying in the range of 0 to 1. Specifically, the sum total of correction coefficients of previous values and of present values is 1 in that the weighted correction value of previous values is set to α and the weighted correction value of present values is set to (1−α); as a result, the phase currents that are calculated through weighting are set to lie between a previous value and a present value, and calculation of an unexpected phase current is thus avoided.

The weighted correction value α varies depending on the ON time of the switching elements, while the ON time of the switching elements is determined by the frequency of the carrier wave 71 and the frequency of the phase currents. Accordingly, the weighted correction value α is calculated according to a two-dimensional or three-dimensional map into which the foregoing are input. These maps are adapted for instance through tweaking of parameters beforehand, in an actual machine.

The weighted correction value α can be calculated on the basis of phase current frequency alone in a case where the frequency of the carrier wave 71 is fixed. In Embodiment 1, accordingly, there is prepared beforehand a two-dimensional map having as one axis thereof the rotational speed calculated from the rotation angle θ acquired by the angle sensor 4, and the weighted correction value α is calculated using the two-dimensional map, by exploiting the fact that the frequency of the phase currents and the rotational speed of the AC rotating electrical machine 3 are synchronized.

The parameters used as the axes of the two-dimensional map for working out the weighted correction value α are not limited to the rotational speed of the AC rotating electrical machine 3. For instance, the rotation angle θ and the actual ON time Duty of phase voltage are likewise synchronized with the frequency of the phase currents, as is the case with the rotational speed; accordingly, the weighted correction value α may be calculated on the basis of a two-dimensional map or three-dimensional map having at least any one of the foregoing as an axis. The actual ON time Duty denotes the ratios of periods of actual ON time of the upper switching elements 41 with respect to the cycle of the carrier wave 71.

In a case where phase current is sampled at the timing of the crest of the carrier wave 71, as illustrated in FIG. 4B, sampling is performed with the switching elements in an ON state, and accordingly it is not necessary to estimate the phase current value with the switching elements in an ON state. However, the slope of the phase current waveform differs between an ON-change and an OFF-change of the switching elements, as illustrated in FIGS. 4A and 4B, and accordingly an offset arises between an intermediate timing T1 of the timings at which the phase currents are to be acquired, i.e. from turn-ON until the switching elements are turned OFF, and an intermediate timing T2 from trough to trough of the carrier wave 71.

Therefore, the phase current correction unit 61 estimates the phase current values on the basis of Expression (8) above using the weighted correction value α, in the same way as in the case of sampling at the troughs of the carrier wave 71.

In Embodiment 1, as described above, the CPU 11 calculates a proportion of each phase voltage with respect to the DC voltage, using the time from rising to falling of the midpoint potential detected by the midpoint potential detection unit 12, and using the DC voltage applied to the AC operating section 22, and works out the DC current estimated value Idc on the basis of the calculated proportion of the phase voltages and the phase current values Iu, Iv, Id detected by the phase current detection unit 23. As in Embodiment 1 of the present invention, in comparison between an instance where the DC current estimated value Idc is calculated using directly measured midpoint potential information and an instance where the DC current estimated value is calculated using a phase voltage command value, as disclosed in Japanese Patent No. 4794603, the CPU processing load is higher in the latter instance, since dead time or the like must be corrected in order to estimate actual phase voltages using the phase voltage command value. Enhancement of estimation precision becomes an issue when taking into consideration also variability in dead time derived from element variability. In the former instance, i.e. control method of Embodiment 1, by contrast, the estimated value can be calculated with good precision, since the phase voltage is estimated using the midpoint potential information having been directly measured. Moreover, correction of dead time or the like and element variability need not be addressed herein, and accordingly the processing load of the CPU can be reduced.

In order to reduce the load of the CPU when working out the DC current estimated value Idc on the basis of the proportion of the phase voltages and on the basis of the phase current values Iu, Iv, Id in Embodiment 1, the DC current estimation unit 33 calculates the DC current estimated value Idc, as given in Expression (7), on the basis of the actual ON times Ton_u, Ton_v, Ton_w for respective phases calculated by the actual ON time calculation unit 32 using Expression (4) and Expression (6), the phase currents Iu, Iv, Iw detected by the phase current detection unit 23, and the cycle Tcarrier of the carrier wave 71. Therefore, the DC current estimated value Idc can be calculated as a result of a simple computation process, and hence it becomes possible to further reduce the load of the CPU 11 involved in such a computation process.

In Embodiment 1, the DC current estimation unit 33 calculates the DC current estimated value Idc through weighting, by the weighted correction value $\alpha$, of the previous values $I_{x(k-1)}$ of phase current and the present values $I_{x(k)}$ of phase current, as given in Expression (8), using the previous values $I_{x(k-1)}$ of phase current acquired by the phase current detection unit 23 in a previous carrier cycle, the present values $I_{x(k)}$ of phase current acquired by the phase current detection unit 23 in a present carrier cycle, and the weighted correction value $\alpha$. Generally, the timing of the carrier cycle and the timing at which the phase currents are to be acquired are offset from each other on account of the relationship between the carrier frequency and the frequency of the phase currents. In Embodiment 1, a DC current estimated value Idc of yet better precision can be calculated by estimating phase current values through weighting with the weighted correction value $\alpha$.

The weighted correction value $\alpha$ is calculated for instance on the basis of the frequency of the carrier wave and the frequency of the phase currents. In this case, the offset amount between the trough timing of the carrier wave and the timing at which the phase currents are to be acquired differs depending on the carrier frequency and the frequency of the phase currents; accordingly, a DC current estimated value Idc of yet better precision can be calculated through calculation of the weighted correction value $\alpha$ on the basis of a two-dimensional or three-dimensional map into which the foregoing have been input.

Alternatively, the weighted correction value $\alpha$ may be set to be calculated on the basis of at least any one of the rotational speed of the AC rotating electrical machine 3 and the actual ON time Duty of phase voltage. In a case where the carrier frequency is fixed, the offset amount between the trough timing of the carrier wave and the timing at which the phase currents are to be acquired differs depending on the frequency of the phase currents. Accordingly, the weighted correction value can be computed, without calculating the frequency of the phase currents, also on the basis of the actual ON time of each phase voltage or the rotational speed of the AC rotating electrical machine 3, which changes in synchrony with the frequency of the phase currents.

A value in the range of 0 to 1 is set herein as the weighted correction value $\alpha$. The sum total of correction coefficients of previous values and present values is 1 in that the weighted correction value of previous values is set to $\alpha$, and the weighted correction value of present values is set to $(1-\alpha)$; as a result, the phase currents that are calculated through weighting are set to lie between a previous value and a present value, and calculation of an unexpected phase current can be thus avoided.

What is claimed is:

1. A control device of an AC rotating electrical machine that controls, via an inverter circuit, an AC rotating electrical machine provided with polyphase armature windings,
    the inverter circuit being made up of respective upper switching elements and lower switching elements provided corresponding to each phase of the AC rotating electrical machine, and receiving supply of power from a DC power supply to drive the AC rotating electrical machine,
    the control device comprising:
        a midpoint potential detection unit comprising a plurality of comparators that respectively detects, for each phase, whether a midpoint potential between the upper switching element and the lower switching element of the inverter circuit is equal to or greater than a threshold voltage, a number of the plurality of comparators being equal to a number of the phases of the AC rotating electrical machine;
        a phase current detection unit that detects a phase current of each phase of the AC rotating electrical machine; and
        a control unit that calculates a current estimated value of DC current that is input from the DC power supply to the inverter circuit, on the basis of the midpoint potential of each phase detected by the midpoint potential detection unit and the phase current of each phase detected by the phase current detection unit,
    wherein the control unit includes an actual ON time calculation unit that calculates an actual ON time during which voltage is actually applied to each phase of the AC rotating electrical machine, on the basis of time from rising to falling of the midpoint potential of each phase detected by the midpoint potential direction unit, and
    wherein the midpoint potential detection unit is configured to output a HI signal to the control unit if the midpoint potential of each of the phase is determined to be equal to or greater than the threshold voltage, and output a LOW signal to the control unit if the midpoint potential of each of the phase is detected to be lower than the threshold voltage.

2. The control device of an AC rotating electrical machine according to claim 1,
    wherein the control unit includes:
        a DC current estimation unit that calculates the current estimated value on the basis of the actual ON time for each phase as calculated by the actual ON time calculation unit, each phase current detected by the phase current detection unit, and a cycle of a carrier wave that is used when modulating a phase voltage command value, for each phase of the AC rotating electrical machine, to driving pulses for the upper switching elements and the lower switching elements.

3. The control device of an AC rotating electrical machine according to claim 1,
wherein the DC current estimation unit uses previous values of phase current acquired by the phase current detection unit in a previous cycle of the carrier wave, present values of phase current acquired by the phase current detection unit in a present cycle of the carrier wave, and a weighted correction value, to calculate the current estimated value through weighting, by the weighted correction value, of the previous values of phase current and the present values of phase current.

4. The control device of an AC rotating electrical machine according to claim 3,
wherein the weighted correction value is calculated on the basis of a frequency of the carrier wave and a frequency of the phase current.

5. The control device of an AC rotating electrical machine according to claim 3,
wherein the weighted correction value is calculated on the basis of at least any one of a rotational speed of the AC rotating electrical machine and an actual ON time Duty of phase voltage.

6. The control device of an AC rotating electrical machine according to claim 3,
wherein the weighted correction value takes on a value in the range of 0 to 1.

* * * * *